Sept. 5, 1950      L. H. FLORA      2,521,354
SHEET METAL SPRING CLIP FOR SECURING MOLDINGS
Filed Sept. 25, 1947
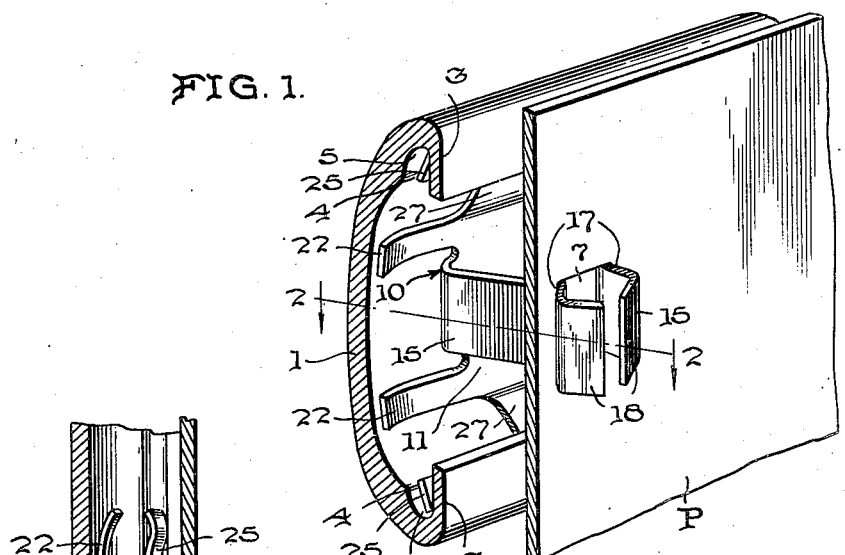
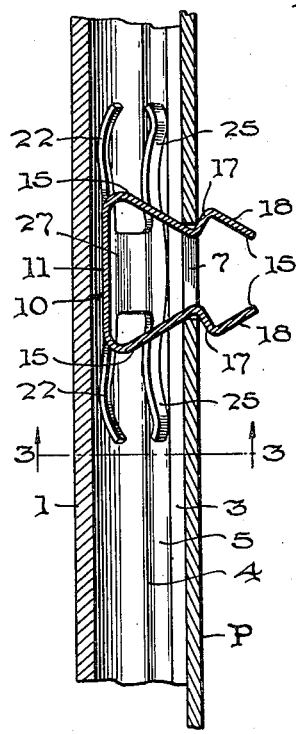
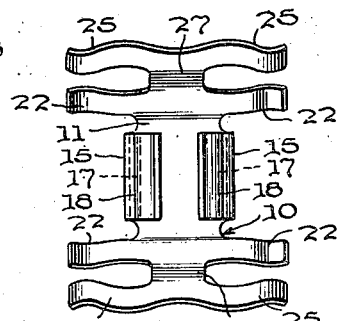 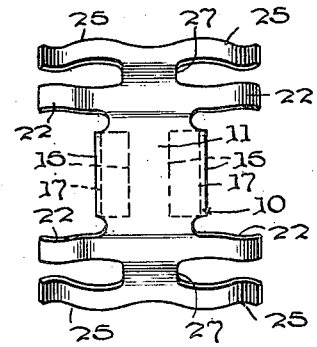
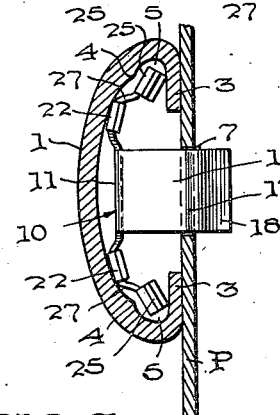 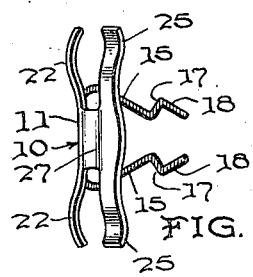
INVENTOR.
LAURENCE H. FLORA
BY
H. G. Lombard
ATTORNEY Patented Sept. 5, 1950

2,521,354

UNITED STATES PATENT OFFICE 2,521,354

SHEET METAL SPRING CLIP FOR SECURING MOLDINGS

Laurence H. Flora, Cleveland, Ohio, assignor to Tinnerman Products, Inc., Cleveland, Ohio, a corporation of Ohio Application September 25, 1947, Serial No. 776,119

7 Claims. (Cl. 24—73)

This invention relates to installations for moldings, trim strips and the like and deals with the mounting and securing of such finishing objects to supporting panels and similar surfaces, especially those accessible from one side only.

More particularly, this invention is directed to improvements in the construction of snap stud fastening devices or attaching clips designed for use in combination with hollow moldings, and the like, in a manner whereby such moldings and similar objects may be easily and quickly applied and rigidly mounted on a supporting surface by a simple, assembling operation from the accessible side only of such supporting surface.

A primary object of the invention is to provide such a molding installation, or the like, comprising an improved attaching clip which is designed to secure the moldings effectively despite manufacturing variations and inconsistencies in the space between the inturned flanges and the crown or roof of the molding channel or trim strip. Moldings, trim strips and similar finishing objects in elongate form which are made of plastic materials frequently are not uniform throughout their lengths in the space between the roof of the molding and the inturned flanges and these irregularities often vary to a relatively wide degree. Consequently, in the use of clips designed only for a specific size and spacing of the molding flanges there are usually several clips in an installation which are so loosely attached to the molding that they do not secure the molding properly with complete effectiveness in the manner intended. The improved clip fastener of the present invention overcomes these disadvantages in that it is adapted to compensate for such manufacturing variations and irregularities in the attachment thereof to the molding and thereby provide a strong, durable and reliable molding installation in which each clip secures the molding or trim strip firmly and rigidly in the most effective manner even though the molding may have such manufacturing variations and irregularities.

A further object of the invention is to provide a molding installation of the kind described and an improved clip fastener therefor having a resilient head member that engages in the molding in cooperation with laterally spaced and offset spring elements which exert resilient spring pressure on the flanges of the molding in a manner whereby such clips are adapted to seat rigidly in varying size spaces between the inturned flanges and the roof of the molding and thereby compensate for manufacturing irregularities and variations in the size and thickness of the molding flanges to insure a firm and rigid connection of the clips to the molding at all points in mounting thereof.

Another object of the invention is to provide an improved clip fastener for molding installations and the like in which the clip comprises a relatively large head member defined by elongate resilient head sections and cooperating spring elements in laterally spaced and offset relation thereto in a manner whereby the clip is adapted for connection to moldings and similar objects of relatively large size and cross-section.

Another object of the invention is to provide an improved clip fastener of this character that is particularly advantageous in comprising a relatively simple construction which is admirably suited for economical quantity production in the manufacture of such clips having relatively large heads for use with moldings of relatively large cross-section.

Further objects and advantages of the invention, and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is a fragmentary perspective view of an installation of a molding strip on an apertured supporting panel, with parts broken away to illustrate the connection of the clip fastener to the molding;

Fig. 2 is a sectional view along line 2—2 of Fig. 1, looking in the direction of the arrows;

Fig. 3 is a sectional view on line 3—3 of Fig. 2, looking in the direction of the arrows;

Fig. 4 is a bottom plan view of the fastener per se;

Fig. 5 is a top plan view of the fastener; and,

Fig. 6 is an edge elevational view of the improved clip fastener.

Referring now, more particularly, to the drawings, there is shown by way of illustration a hollow molding 1 or similar trim strip or finishing object provided with inturned flanges 3 with which the clip fasteners, designated generally 10, are connected in securing the molding onto an apertured support such as a panel P. The molding may be formed from any suitable material such as extruded plastic compositions, reamed wood strips or sheet metal strips in the general form of a channel shape provided with the aforesaid inturned flanges 3. In the present example, there is illustrated the general appearance of the molding in cross-section when made of plastic materials, the design preferably being such that the molding includes a crown or roof portion having any desired ornamentation and lateral enlargements 4 which add to the strength and rigidity of the molding along the longitudinal sides thereof. The enlargements 4 are provided with longitudinal grooves 5 defining the adjacent inturned flanges 3. Frequently the thickness of the flanges or the spacing thereof from the roof of the molding is not uniform throughout the lengths of the flanges and vary to a considerable degree incidental to the molding operation. The clip fasteners of the present invention are so constructed as to compensate for any such variations and irregularities in the molding and are adapted to be attached to the molding in a firm and rigid connection regardless of differences in thickness of the inturned flanges or inconsistencies in the spacing thereof from the roof of the molding. This assures a completely tight and rigid attachment of the molding to the panel P throughout its length and thereby eliminates any possibility of loosening or displacement of the molding from attached position under the most severe conditions of service and usage of an appliance or apparatus embodying a molding installation in accordance with the invention.

Preparatory to mounting the molding, the supporting panel P is provided by punching or drilling, with suitably spaced openings 7 along the path which the molding extends in mounted position for receiving the shanks of the attaching clips 10. In many applications the supporting structure is accessible from one side only and accordingly, it is expedient to provide a molding construction wherein the attaching clips may be readily assembled with the molding which is then mounted on the supporting structure by springing the projecting shanks of the attaching clips into the previously prepared fastener receiving openings 7 by a simple axial force and, if necessary, by slight hammer blows applied to the outer exposed surface of the molding by a lightweight rubber mallet.

The preferred form of attaching clip of the invention comprises a one-piece sheet metal device which may be readily constructed from an inexpensive, unitary stamping of sheet metal, cold rolled metal, spring steel, or the like. Preferably the blank is obtained from a substantially rectangular section which may be provided from ordinary sheet metal strip stock with minimum loss or waste of material. As best seen in Figs. 4 and 5, the blank is so stamped and formed as to provide a central body portion 11 defining a part of the head of the fastener, and a shank comprising a pair of integral cooperating spring arms 15 bent from said central body portion 11 to project in the same general direction and define a resilient snap-stud type of attaching shank. Such a shank may be provided in any other suitable form or construction which is receivable in the fastener receiving openings 7 in panel P and these openings may be either of round, rectangular or other configuration, as desired, with the shanks of the clip fasteners designed for fastening in any such opening, preferably by snap fastening action.

In the clip fastener shown, the spring arms 15 are adapted to be secured in the panel opening 7 by snap fastening engagement of outwardly projecting shoulders 17 on said arms with marginal edge portions of said panel opening 7. The said arms 15 depend from the base 11 of the fastener at points spaced apart greater than the size of the panel opening and extend inwardly in inclined relation toward each other to predetermined points where they are bent outwardly to define the said outwardly projecting shoulders 17 at a suitable distance from the head of the fastener for proper engagement in the panel opening 7. Adjacent said outwardly projecting shoulders 17, the free ends of said springs arms 15 are inclined inwardly toward each other to define inclined guide surfaces 18 having their extremities spaced apart a distance less than the size of the panel opening 7 so as to be readily received therein in the initial application of the clip shank to secured position in said panel opening.

The head member of the clip fastener is provided by resilient H-shaped head portions on either side of the central body 11 in a manner whereby the entire head of the clip is relatively large and therefore, particularly adapted for attachment to moldings of relatively large cross-section. Each H-shaped head portion comprises an inner pair of longitudinally extending fingers 22 adjacent the base 11 which are arched or slightly rounded upwardly from said base, and an outer generally similar pair of longitudinally extending spring fingers 25 carried by a connecting strip or web 27 in offset, downwardly spaced relation to said inner pair of spring fingers 22. The web or strip 27 connecting said pair of fingers 25 to the associated pair of fingers 22 extends downwardly from the base 11 and is bent in a manner whereby the outer spring fingers 25 are disposed substantially in a common plane spaced downwardly and generally parallel to the approximate plane of the associated inner fingers 22. The outer spring fingers 25 are arched and rounded slightly downwardly with respect to the fastener base 11 so that the rounded formation thereof is opposite to that of the upwardly rounded inner spring fingers 22. Each outer and lower finger 25, accordingly, cooperates with the adjacent inner and upper finger 22 to define spaced resilient spring elements which are engageable, respectively, with an inturned flange portion 3 of the molding and the adjacent roof portion of the molding. Preferably, the extremities of said fingers 22, 25, are curved slightly inwardly toward each other to facilitate the initial application thereof into the channel of the molding. The spacing of said pairs of spring fingers 22, 25, in normal untensioned relation, is somewhat greater than the spacing between the engaged portions of the inturned flange and roof of the molding so that said spring fingers must be compressed toward each other and thereby tensioned in rigid, frictional engagement with the molding in attached position thereon.

In attaching the clips 10 thus provided to a molding, the several pairs of cooperating spring fingers 22, 25 of a clip are compressed as necessary to insert the H-shaped head portions within the channel of the hollow molding from an end thereof, whereupon the clip may be slid along the molding to the desired position in registry with the associated opening 7 in the supporting panel P. The inherent resiliency of the spring fingers 22, 25 permits the same to yield toward each other as necessary for the clip to slide along the molding in this manner and this action is facilitated by the rounded or bowed formation of said spring fingers. The clips are so positioned in the molding channel that the outer spring fingers 25 of a clip resiliently engage the inturned flanges 3 of the molding under tension in cooperation with the inner spring fingers 22 in tensioned frictional engagement with the roof of the molding, substantially as shown in Figs. 2 and 3.

From the foregoing it will be understood that in the procedure for mounting a molding on the support P, as many attaching clips 10 as are necessary are assembled with the molding, in the manner aforesaid, and in spaced relation corresponding to the spacing of the fastener receiving openings 7 provided in the supporting panel P along the path which the molding extends in mounted position. The molding provided with the clip fasteners 10 attached thereto is then ready for mounting onto the supporting panel P. In such mounting operation, the projecting shank of each clip defined by the cooperating spring arms 15 is readily entered into the associated panel opening 7 inasmuch as the inwardly inclined leading end portions 18 of said spring arms having a spacing at their extremities less than the size of the panel opening, as aforesaid. Axial pressure is then applied to the top of the molding in the area of the head of the clip fastener to move the shank of the clip axially into the panel opening, whereupon the inclined guide surfaces 18 cam against the marginal edges of the panel opening 7 to cause a gradual contraction of the spring fingers 15 as necessary for the outwardly projecting shoulders 17 on said spring arms to pass through the opening and spring outwardly into locked abutting engagement with the adjacent rearward marginal portions of the panel opening, substantially as shown in Fig. 2. Preferably said outwardly projecting shoulders 17 are provided in the form of tapering abutments adapted to ride on the corner edges of the panel opening and thereby automatically seat in fastening engagement with such corner edges in the most effective manner even though the marginal portion of the panel is not of uniform thickness or has some slight irregularity therein. In addition, such shoulders having tapering cam surfaces 17 adapt the clip fastener for effective application to panel supports of different thicknesses within limits, and otherwise provide a suitable axial drawing action on the clip shank to secure the molding tightly against the supporting panel in mounted position. Inasmuch as the H-shaped head portions of the clip defined by the cooperating pairs of spring fingers 22, 25, are interlocked with the molding flanges 3 and firmly engage the roof of the molding, there is no tendency for the clips to become displaced or removed from attached position with the molding during the operation of forcing the clip shanks 15 through the panel opening. Accordingly, the shank elements 15 of a clip may be compressed toward each other to tensioned locking engagement in its associated panel opening 7 without disturbing the rigid frictional engagement of the head portions in connected relation with the molding.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness. A cheap but effective fastener may be provided from cold rolled metal, such as cold rolled steel, which is untempered but of a spring metal nature and capable of providing an effective and reliable fastener for a molding installation in accordance with the invention.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A clip for securing a molding having inturned flanges to a support provided with a fastener receiving opening, comprising, a sheet metal body bent to define a one-piece plate-like base adapted to extend generally horizontally across the molding between said flanges and a shank projecting from said base receivable in said opening in the support, a head portion at an end of said base comprising an upwardly extending spring finger element for engaging the inner surface of the roof of the molding, and an adjoining cooperating downwardly extending spring finger element for engaging the inner surface of an inturned flange of said molding.

2. A clip for securing a molding having inturned flanges to a support provided with a fastener receiving opening, comprising, a sheet metal body bent to define a one-piece plate-like base adapted to extend generally horizontally across the molding between said flanges and a shank projecting from said base receivable in said opening in the support, a head portion at an end of said base comprising a pair of oppositely extending spring elements for engaging the inner surface of the roof of the molding and an adjoining cooperating pair of oppositely extending spring elements for engaging the inner surface of an inturned flange of said molding.

3. A clip for securing a molding having inturned flanges to a support provided with a fastener receiving opening, comprising, a sheet metal body bent to define a one-piece plate-like base adapted to extend generally horizontally across the molding between said flanges and a shank projecting from said base receivable in said opening in the support, a head portion at an end of said base comprising a pair of oppositely extending spring elements for engaging the inner surface of the roof of the molding, a web extending laterally of said pair of spring elements, and a cooperating pair of oppositely extending spring elements carried by said web for engaging the inner surface of an inturned flange of said molding.

4. A clip for securing a molding having inturned flanges to a support provided with a fastener receiving opening, comprising, a sheet metal body bent to define a one-piece plate-like base adapted to extend generally horizontally across the molding between said flanges and a shank projecting from said base receivable in said opening in the support, a substantially H-shaped head portion attached to each end of said base comprising a pair of oppositely extending spring elements for engaging the inner surface of the roof of the molding, a web extending laterally of said pair of spring elements, and a cooperating pair of oppositely extending spring elements carried by said web adapted to engage the inner surface of an inturned flange of said molding.

5. A clip comprising a sheet metal body bent to define a base and a shank projecting from said base, an H-shaped head portion carried by an end of said base comprising a pair of oppositely extending spring elements, a web extending laterally of said pair of spring elements, and a cooperating pair of oppositely extending spring elements carried by said web.

6. A clip comprising a sheet metal body bent to define a base and a shank projecting from said base, an H-shaped head portion attached to opposite ends of said base, each of said H-shaped head portions comprising a pair of oppositely extending spring elements, a web extending laterally of said pair of spring elements, and a cooperating pair of oppositely extending spring elements carried by said web.

7. A clip comprising a sheet metal body bent to define a base and spring arms projecting from two opposite sides of said base and extending in the same general direction to define a snap-stud shank, an H-shaped head portion on each end of said base, each of said H-shaped head portions comprising a pair of oppositely extending spring fingers, a web extending laterally of said pair of spring fingers, and a cooperating pair of oppositely extending spring fingers carried by said web.

LAURENCE H. FLORA.

REFERENCES CITED

The following references are of record in the file of this patent:

UNITED STATES PATENTS

| Number | Name | Date |
|---|---|---|
| 2,147,779 | Van Uum | Feb. 21, 1939 |
| 2,165,412 | Place | July 11, 1939 |
| 2,217,781 | Wiley | Oct. 15, 1940 |
| 2,246,720 | Churchill | June 24, 1941 |
| 2,306,460 | Meyer | Dec. 29, 1942 |